(12) United States Patent
Donovan

(10) Patent No.: US 6,328,515 B1
(45) Date of Patent: *Dec. 11, 2001

(54) FASTENER WITH ANTI-CROSS-THREADING POINT AND METHOD OF ASSEMBLY

(75) Inventor: Steven P. Donovan, Roscoe, IL (US)

(73) Assignee: Textron Inc., Providence, RI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/916,164

(22) Filed: Aug. 21, 1997

Related U.S. Application Data

(60) Provisional application No. 60/026,608, filed on Sep. 24, 1996.

(51) Int. Cl.[7] .................................................... F16B 25/00
(52) U.S. Cl. ................................................................ 411/386
(58) Field of Search ..................... 411/386, 387.1–387.8, 411/378, 411, 424

(56) References Cited

U.S. PATENT DOCUMENTS

| | | | |
|---|---|---|---|
| 2,531,892 | * 11/1950 | Reese | 411/378 |
| 2,856,617 | * 10/1958 | Widmann | 411/324 |
| 3,318,182 | 5/1967 | Carlson . | |
| 3,352,190 | 11/1967 | Carlson . | |
| 3,462,114 | 8/1969 | O'Dell, Sr. et al. . | |
| 3,683,436 | 8/1972 | Reiland . | |
| 4,261,402 | 4/1981 | Stanaitis . | |
| 4,630,985 | 12/1986 | Simons . | |
| 4,637,764 | * 1/1987 | Imai | 411/386 |
| 4,789,288 | 12/1988 | Peterson . | |
| 4,915,560 | 4/1990 | Peterson et al. . | |
| 4,971,502 | 11/1990 | Oh . | |
| 4,981,406 | 1/1991 | Weiss et al. . | |
| 5,019,080 | 5/1991 | Hemer . | |
| 5,064,327 | 11/1991 | Hughes . | |
| 5,073,073 | * 12/1991 | Kazino . | |

(List continued on next page.)

FOREIGN PATENT DOCUMENTS

182613 * 1/1989 (JP) .

Primary Examiner—Flemming Saether
(74) Attorney, Agent, or Firm—Trexler, Bushnell, Giangiorgi, Blackstone & Marr LTD

(57) ABSTRACT

A novel fastener member and a novel method of assembly are provided for engagement of the fastener member with a female member having an internally threaded bore. The fastener member includes a threaded shank portion and a novel point at a work entering end thereof. The point includes a radiused portion which is engaged within the female member threaded bore to start engagement of the fastener member therewith. In certain embodiments, the point further includes an unthreaded portion, which has a diameter that is slightly less than a minor diameter of the shank portion, connecting the radiused portion and the threaded portion. The radiused portion has a maximum diameter which is slightly less than a minor diameter of the threaded bore. The radiused portion may take many forms and, for example, may be spherical; partially spherical; or formed from a predetermined number of radiused portions integrally formed with each other. To engage the fastener member and the female member, the radiused portion is disposed within the threaded bore and thereafter, rotational movement and an end load are applied to one or the other of the fastener member or the female member. The radiused portion is completely inserted into the bore prior to engagement of the shank portion with the threads in the bore, and will promote lateral as well as pivotal moment as required to align the respective members to attain proper thread engagement.

18 Claims, 9 Drawing Sheets

U.S. PATENT DOCUMENTS

| | | |
|---|---|---|
| 5,108,240 | 4/1992 | Liebig . |
| 5,209,622 * | 5/1993 | Kazino .................................. 411/386 |
| 5,234,301 | 8/1993 | Grossberndt et al. . |
| 5,320,467 | 6/1994 | Erbes . |
| 5,419,667 | 5/1995 | Avgoustis . |
| 5,730,566 | 3/1998 | Goodwin et al. . |
| 5,791,849 | 8/1998 | Goodwin et al. . |
| 5,836,731 | 11/1998 | Goodwin et al. . |

* cited by examiner

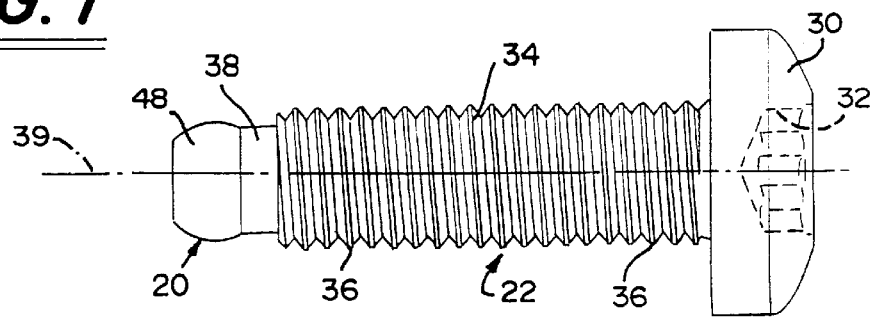
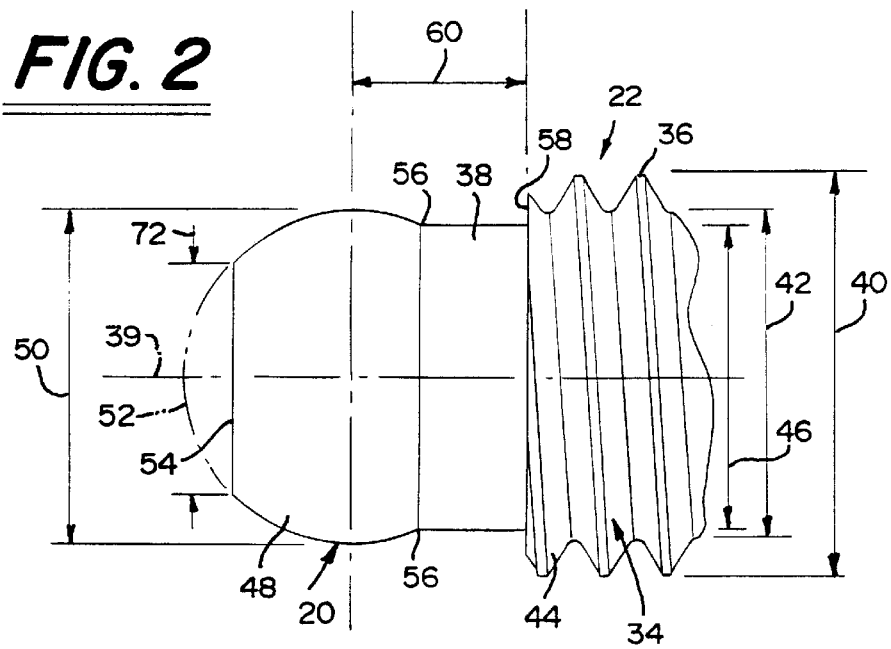
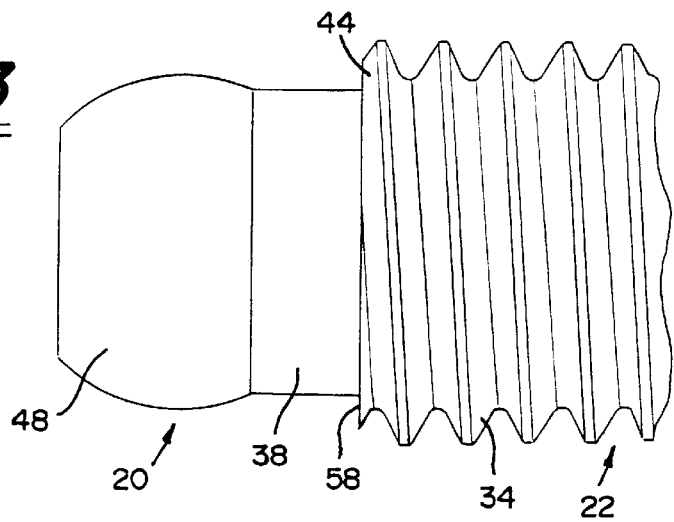

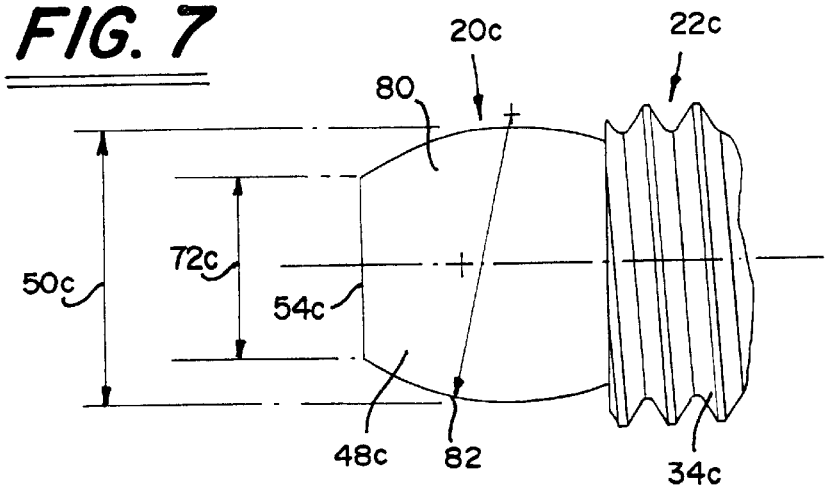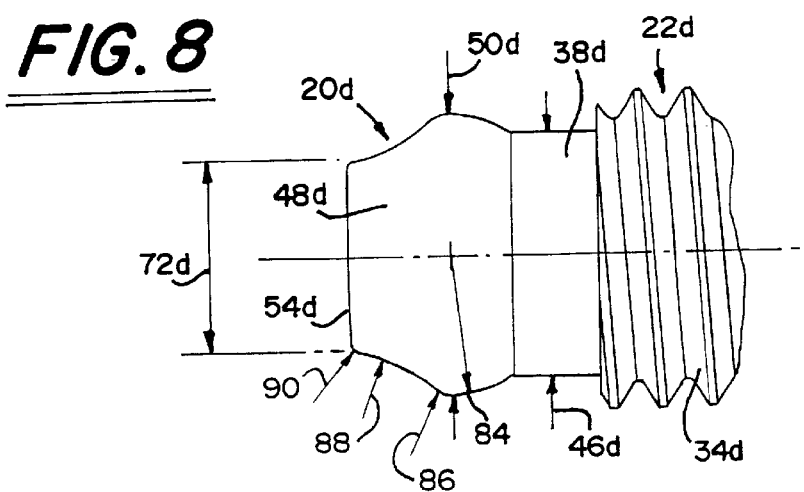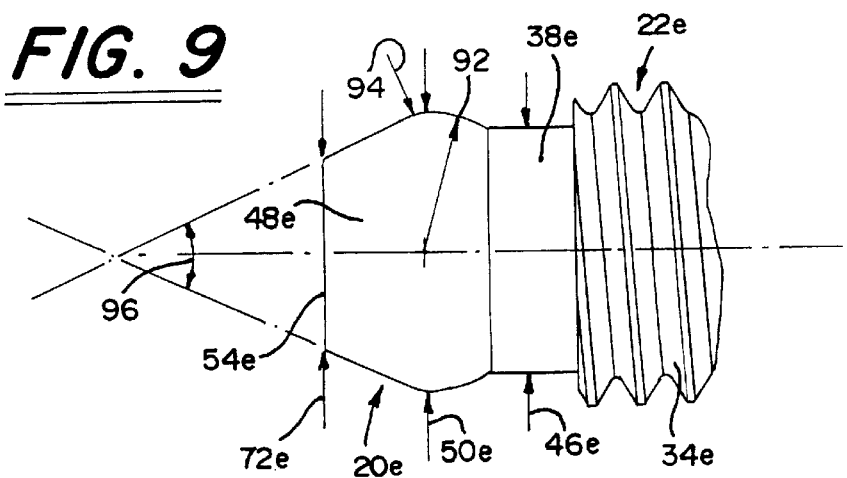

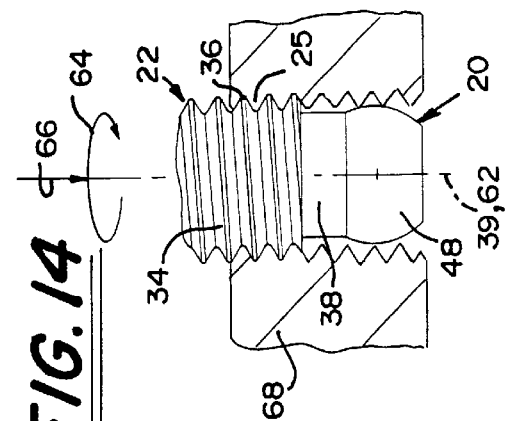
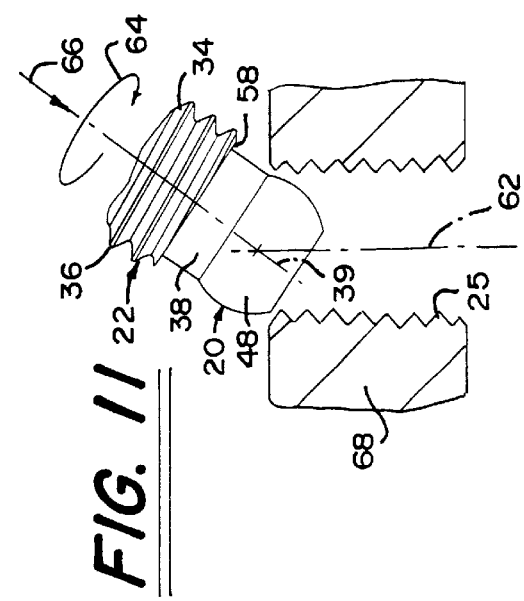
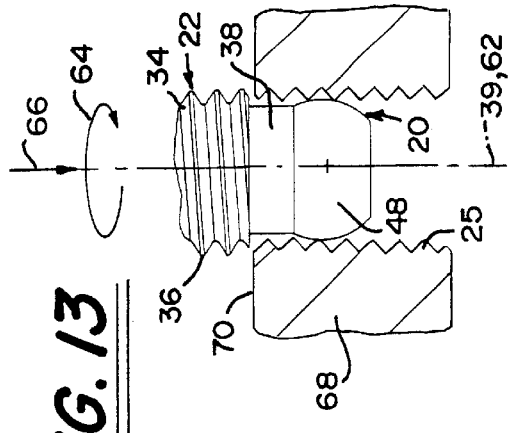
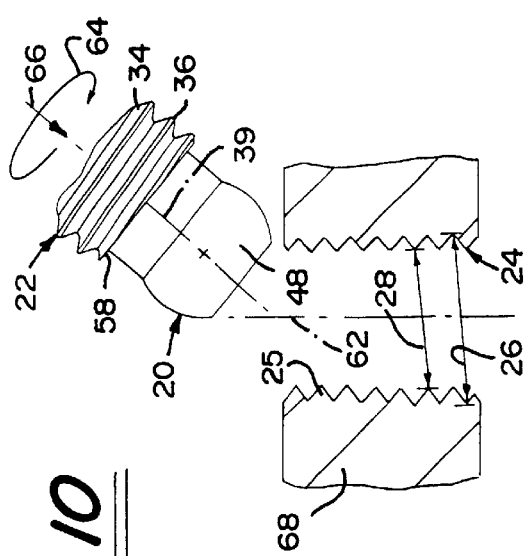
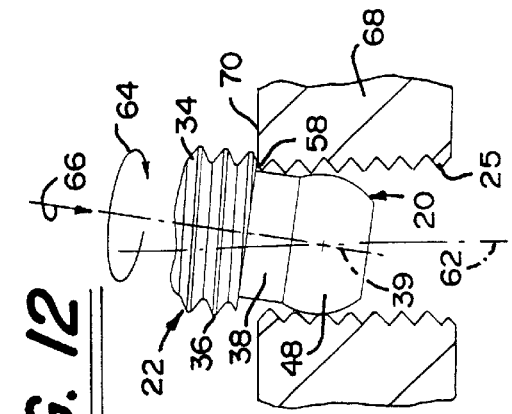

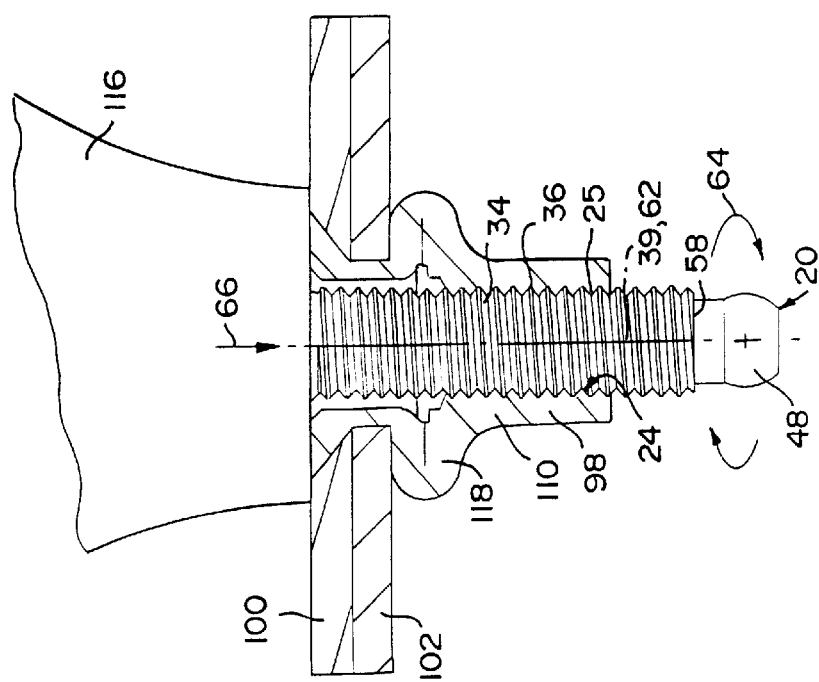
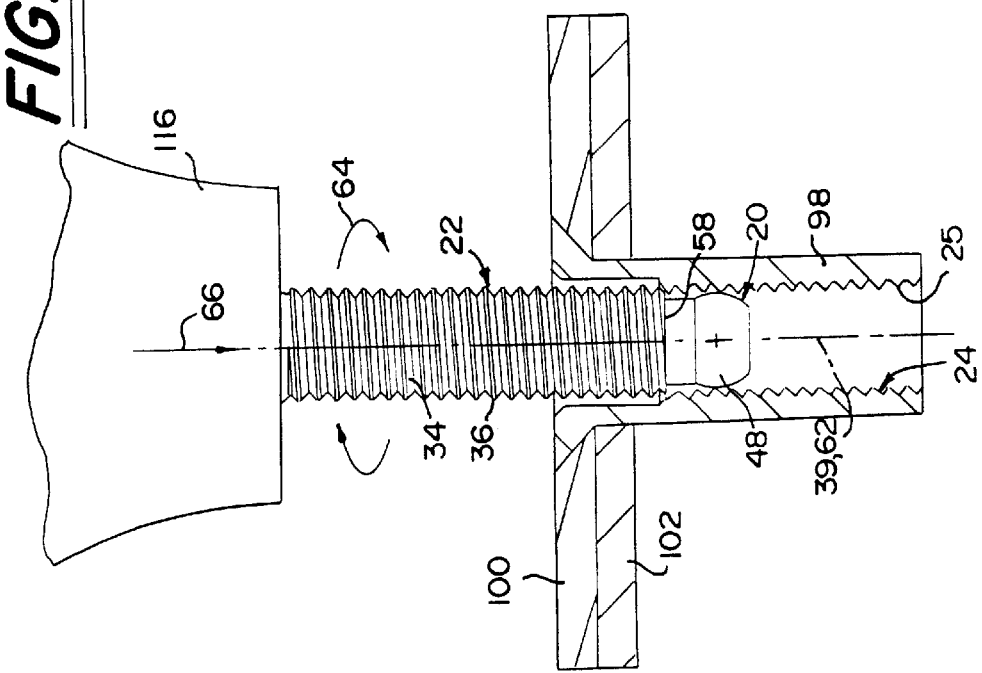

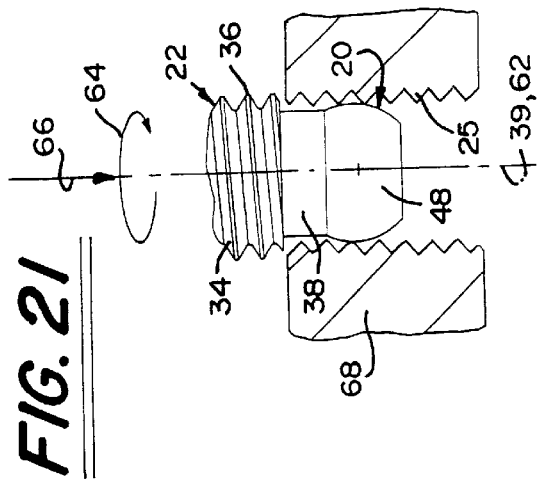
FIG. 20  FIG. 21
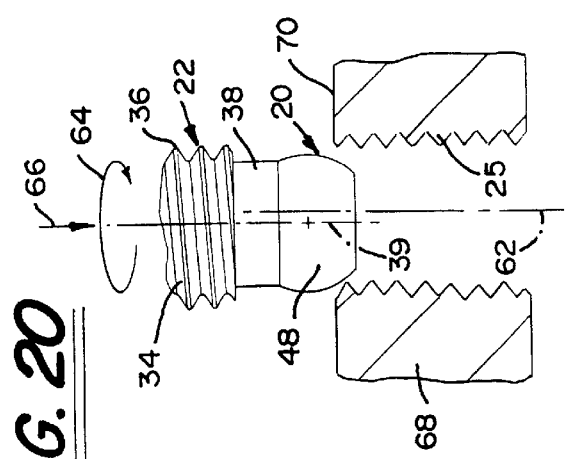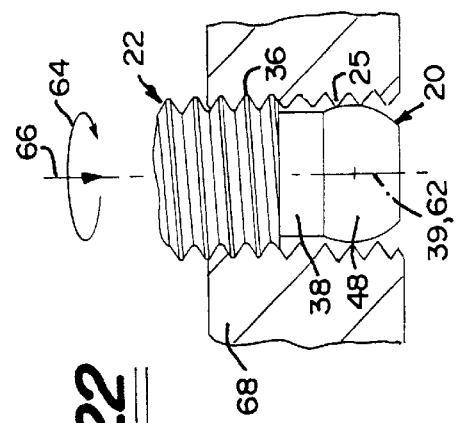
FIG. 19  FIG. 22
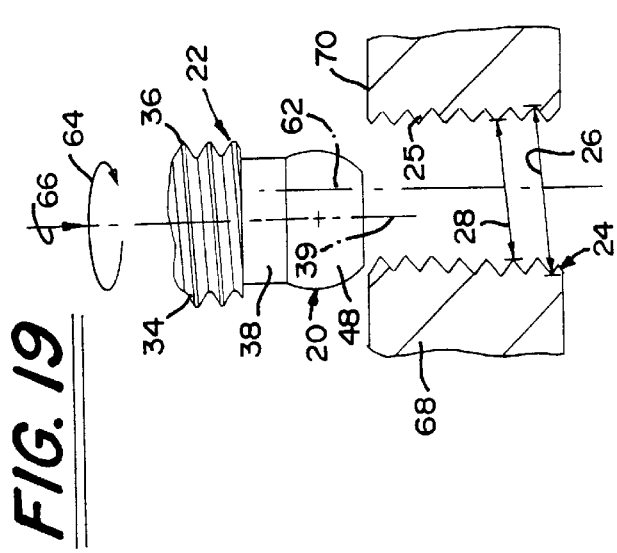

FASTENER WITH ANTI-CROSS-THREADING POINT AND METHOD OF ASSEMBLY

This application claims the priority of provisional application Ser. No. 60/026,608 filed on Sep. 24, 1996, entitled "Fastener Member With Anti-cross-threading Point."

BACKGROUND OF THE INVENTION

This invention is generally directed to a threaded male fastener member having a novel point configuration which prevents the fastener member from cross-threading upon engagement with a correspondingly threaded female member and the method of assembly thereof. Either the fastener member or the female member may be driven, the other member being stationary during the assembly. While the discussion that follows is directed primarily to the situation wherein the fastener member is the driven element and the female or internally threaded member is stationary, it should be kept in mind that the fastener member may be stationary and the internally threaded member, such as a nut, may be driven.

During automated or manual assembly of an externally threaded fastener member with an internally threaded member, such as a nut, a tapped bore in a workpiece or an internally threaded rivet staked to a workpiece, one of a number of conditions will occur at assembly. First, proper engagement of the male threaded fastener member with the female threaded member will be obtained which is an acceptable condition. Second, cross-threading will occur which is an unacceptable condition. Third, a no-start will result wherein the male threaded component rotates without effecting threaded engagement with the threaded female member which is also an unacceptable condition.

If proper engagement is obtained, the external thread on the fastener member engages with the internal thread in the female member and the external thread then follows the helix path of the internal thread. The mating of the helix angle of the internal and external threads provides an inclined plane which converts input torque into clamp force in the joint.

Cross-threading occurs when a fastener member is engaged with a female member and the threads are not properly aligned when the threads on the fastener member and in the female member first engage. If the external threads on the fastener member and the internal threads in the female member are not properly aligned at the start of the threading operation, the external thread tends to cross over the crest of the internal thread which can produce deformation of the threads and binding or seizing up of the components before the desired depth of engaging is obtained. Unless the fastener member or the female member are manually realigned at this point, the external thread will wedge against the internal thread thus preventing assembly and/or damaging the threads. Cross-threading is a common occurrence in prior art fastener members, and extremely troublesome in automated assembly operations.

In an automated assembly situation, the occurrence of cross-threading can severely affect productivity. In some cases, assembly workers will have to manually engage the fastener member and the female member for a couple of threads, then apply the automated equipment to these pre-aligned fastener members.

A no-start condition can occur when a rotating fastener member is misaligned with the tapped bore such that the external lead threads of the fastener member do not engage into the tapped bore in a specified period of time. Thus, the fastener member will "spin" at the top of the tapped bore. In some assembly operations, the end of the fastener member "wobbles" which can cause the fastener member not to engage and which can cause the fastener member to quickly move away from the tapped bore. This quick movement can cause damage to the surface of the joint. For example, if the joint is a painted surface, the fastener member could scratch or otherwise mar the surface.

Prior art fastener members which have attempted to prevent cross-threading within a tapped bore are provided with various designs. These prior art designs generally involve an asymmetrical point or entry end on the fastener member, with only a portion thereof on the asymmetrical end point or entry end. Examples of prior art fastener members include a "P" Point, a MAT Point, a CTP Point which is disclosed in U.S. Pat. Nos. 4,981,406 and 5,419,667, an ACT Point which is disclosed in U.S. Pat. Nos. 4,789,288 and 4,915,560, and a TRU-START which is disclosed in U.S. Pat. No. 5,064,327.

The CTP point, the ACT point, and the TRU-START all employ tapered lead threads inserted within a tapped bore before engagement of the fastener member with the tapped bore. This can result in a wedging action which causes cross-threading. The other point designs have a blunt end which can cause a no-start condition at off-angle conditions.

It is desirable to eliminate the cross-threading and no-start problems. The fastener member of the present invention provides such a fastener member. The present fastener member minimizes the problems found in the prior art by several novel improvements to prior art fastener members. Further, the design of the present invention provides a novel fastener design which is capable of improved performance when used with automated assembly equipment and operations. First, the fastener member resists cross-threading. Second, the fastener member is capable of rapid engagement with the tapped bore to reduce the assembly installation time and to improve the ergonomics of a typical installation. Third, the fastener member has a large "window of engagement" into the tapped bore by compensating for a condition where the fastener member and the tapped bore are out-of-alignment or off-angle from each other by providing a self-aligning point and by compensating for a condition where the fastener member and the tapped bore are offset from each other. Further, the externally threaded fastener member has a radiused portion on the entry end thereof which is relatively smooth and free of sharp edges or corners which could catch or hand-up on the internal threads. These features all work together to provide for a smooth engagement of the fastener member with the tapped bore. The point used in the fastener member of the present invention compensates for wobble at the end of the fastener member which reduces the potential damage to the surface of a joint. Fourth, the point length of the fastener member is minimized which lowers material cost, reduces the weight of the fastener member and minimizes interference problems with the point of the fastener member with other components. Fifth, the fastener member of the present invention lowers manufacturing cost as the fastener member threads and the point are roll threaded in one pass. The structural features of the fastener member of the present invention and manner whereby these features function to attain the improved performance discussed above will become apparent from the discussion as follows, especially with respect to the drawings.

OBJECTS AND SUMMARY OF THE INVENTION

A general object of the present invention is to provide a fastener member having a novel point on an end thereof which resists cross-threading and no-start problems when the fastener member is engaged with a tapped bore in an internally threaded member, such as a nut, a tapped bore in a workpiece or an internally threaded rivet staked to a workpiece.

An object of the present invention is to provide a fastener member which is capable of rapid engagement with a tapped bore so as to reduce the assembly installation time and to improve the ergonomics of a typical installation of a fastener member with a tapped bore, and also which provides improved performance when used with an automated assembly process or equipment.

Another object of the present invention to provide a fastener member which has a large "window of engagement-"into a tapped bore by compensating for a condition where the fastener member and the tapped bore are out-of-alignment or off-angle from each other by providing a self-aligning point and by compensating for a condition where the fastener member and the tapped bore are offset from each other.

Yet another object of the present invention is to provide a fastener member having a novel point which length is minimized so as to lowers material cost, reduce the weight of the fastener member and minimize interference problems with the point of the fastener member with other components.

A further object of the present invention is to provide a fastener member which lowers manufacturing cost as the fastener member threads and the point are roll threaded in one pass.

Briefly, and in accordance with the foregoing, the present invention discloses a fastener member and method of application for engagement with a female member having a threaded bore of a predetermined internal major diameter and a predetermined internal minor diameter. The female member may be, for example, a nut, a tapped bore in a workpiece or an internally threaded rivet staked to a workpiece. The fastener member includes a shank portion having thread turns thereon and a novel point at one of the ends thereof and a head at the opposite end thereof which has a multilobular recess formed therein for engagement with a tool. The thread turns on the threaded shank portion define a predetermined major diameter and a predetermined minor diameter. The point includes a radiused portion which is inserted into the threaded bore in the female member to attain coaxial alignment of the components prior to or upon engagement of the fastener member with the female member.

In certain embodiments of the invention, the point of the fastener member further includes an unthreaded portion connecting the radiused portion and the threaded shank portion together. The unthreaded portion has a diameter which is slightly less than the minor diameter of the threaded shank portion. In addition, the unthreaded portion has a length which is at least equal to approximately one pitch of the thread turns on the threaded shank portion.

The radiused portion has a maximum diameter which is slightly less than the minor diameter of the internally threaded bore in the female member. The radiused portion may take many forms and, for example, may be spherical; partially spherical; or formed from a predetermined number of radiused portions integrally formed with each other, so long as the radiused portion is relatively smooth and free of sharp edges or corners which could catch or hand-up on the internal threads in the female member. This provides for a smooth engagement of the fastener member with the tapped bore. In one embodiment, the point includes a tapered portion which is integrally formed with the radiused portion. In another embodiment, the point includes a generally cylindrical portion integrally formed with the radiused portion.

The radiused portion may be provided with a truncated end surface which defines a diameter that is less than the minor diameter of the internally threaded bore in the female member. The truncated end surface is less than the maximum diameter of the radiused portion.

The present invention also envisions the employment of a novel lead thread design that can be used with the above discussed point configuration to enhance performance as a self-aligning, anti-cross-threading fastener member. In this regard, the threaded shank portion has a plurality of threads including a lead thread proximate to the point. The lead thread is of a generally standard profile, which is truncated generally perpendicular to a centerline of the fastener member to form an abrupt end. As such, the truncation occurs in less than one pitch of the thread turn. That is to say, the lead thread gradually and progressively moves from a minimal thread profile to a full thread profile in less than one full thread turn. The purpose for this truncation will become apparent from the discussion to follow.

To engage the fastener member with the female member, the radiused portion is inserted into the threaded bore in the female member. Rotational movement and an end load are applied to the fastener member to engage the threads on the threaded shank portion with the threads in the threaded bore in the female member. The radiused portion is completely inserted into the threaded bore prior to engagement of the threaded shank portion with the threads in the threaded bore. The spherical or general spherical portion of the point will engage the crests of the internal thread and will allow and promote a pivoting movement of the fastener member, so that the fastener axis and the axis of the internally threaded bore are moved into general alignment. As such, co-alignment of the fastener member and the internally threaded bore is attained prior to or upon the external thread of the fastener member engaging the internal thread, thus promoting proper engagement and avoiding a cross-thread or no-start condition. The novel truncated lead thread design also serves to promote proper thread engagement. More specifically, if the fastener member is inserted at an out-of-alignment/off-angle or an offset condition to the bore in the female member, the abrupt or truncated end contacts a top surface of the female member prior to engagement of the threaded shank portion to provide a pivot location about which the fastener member may pivot to move the shank portion into proper alignment. The gradual, progressive nature of the lead thread also promotes proper thread engagement.

In most applications, the fastener or the externally threaded member with the novel anti-cross-threading point design will be the driven component being engaged within the internally threaded bore of a stationary workpiece.

This situation is illustrated in FIGS. 10–22 of the drawings. As illustrated in FIGS. 23–28, however, that the externally threaded component having the novel anti-cross-threading point design of the present invention is the stationary component and the internally threaded member is the driven component. That is, the fastener member is provided in the form of a threaded stud which is staked or otherwise integrally mounted to or part of a stationary component, with the driven component being in the internally threaded member, such as a nut.

DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is a side elevational view of a preferred form of an anti-cross-threading fastener member which incorporates the features of a first embodiment of the invention;

FIG. 2 is an enlarged, partial side elevational view of the entry end portion of the anti-cross-threading fastener member shown in FIG. 1;

FIG. 3 is an enlarged, partial side elevational view of the entry end portion of the anti-cross-threading fastener member shown in FIG. 1 showing the thread run-out of the threaded shank portion of the fastener member;

FIG. 7 is an enlarged, partial side elevational view of the entry end portion of an anti-cross-threading fastener member which incorporates the features of a third embodiment of the invention;

FIG. 8 is an enlarged, partial side elevational view of the entry end portion of an anti-cross-threading fastener member which incorporates the features of a fourth embodiment of the invention;

FIG. 9 is an enlarged, partial side elevational view of the entry end portion of an anti-cross-threading fastener member which incorporates the features of a fifth embodiment of the invention;

FIGS. 10–14 are side elevational views of the anti-cross-threading fastener member shown in FIGS. 1–5 and a partial cross-sectional view of a workpiece or nut in which the anti-cross-threading fastener member of the present invention is being inserted which illustrates the steps in an out-of-alignment or off-angle installation of the anti-cross-threading fastener member into a tapped bore in the workpiece or nut;

FIGS. 15–18 are side elevational views of the anti-cross-threading fastener member shown in FIGS. 1–5 being driven by a tool and a cross-sectional view of an internally threaded rivet staked to a pair of workpieces, each shown partially in cross section, in which the anti-cross-threading fastener member of the present invention is being inserted which illustrates the steps in an out-of-alignment or off-angle installation of the anti-cross-threading fastener member into a tapped bore in the rivet;

FIGS. 19–22 are side elevational views of the anti-cross-threading fastener member shown in FIGS. 1–5 and a partial cross-sectional view of a workpiece or nut in which the anti-cross-threading fastener member of the present invention is being inserted which illustrates the steps in an offset installation of the anti-cross-threading fastener member into a tapped bore in the workpiece or nut;

DETAILED DESCRIPTION OF THE ILLUSTRATED EMBODIMENT

Figure 4:
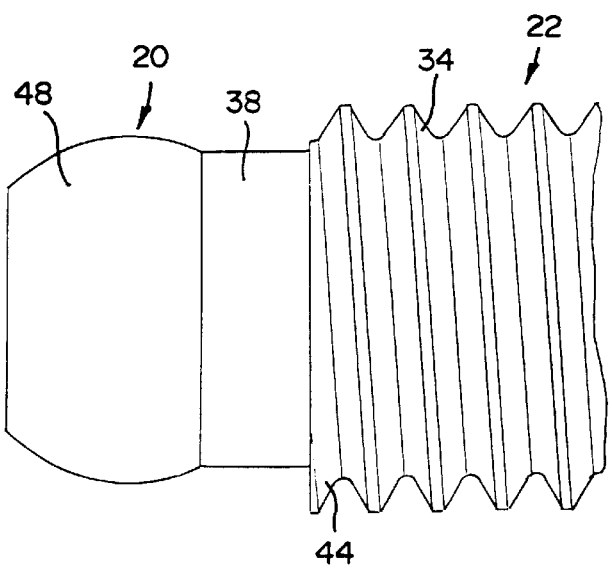
FIG. 4 is an enlarged, partial side elevational view of the entry end portion of the anti-cross-threading fastener member shown in FIG. 1 showing the thread run-out of the threaded shank portion of the fastener member and rotated approximately 90° from that shown in FIG. 3.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The present invention presents a novel point 20 for a fastener member 22 which prevents the fastener member 22 from cross-threading upon insertion into a threaded female member, such as a tapped bore 24 in a workpiece, in a nut 68, or in a rivet 98 staked to a workpiece 100.

The tapped bore 24 is a standard internally threaded bore which includes internal helical threads 25 having a major internal diameter 26 and a minor internal diameter 28, see for example, FIGS. 10 and 19. Even though reference numerals 26 and 28 are not specifically shown in FIGS. 15, 23 or 26, it is to be understood that the tapped bore 24 in each of these are formed in an identical manner.

A first embodiment of the novel point 20 on the fastener member 22 is shown in FIGS. 1–5. A second embodiment of the novel point 20b is shown in FIG. 6; a third embodiment of the novel point 20c is shown in FIG. 7; a fourth embodiment of the novel point 20d is shown in FIG. 8; and a fifth embodiment of the novel point 20e is shown in FIG. 9. Like elements in each embodiment are denoted with like reference numerals with the second embodiment having the suffix "b" after the reference numeral; the third embodiment having the suffix "c" after the reference numeral; the fourth embodiment having the suffix "d" after the reference numeral; and the fifth embodiment having the suffix "e" after the reference numeral.

Figure 25:
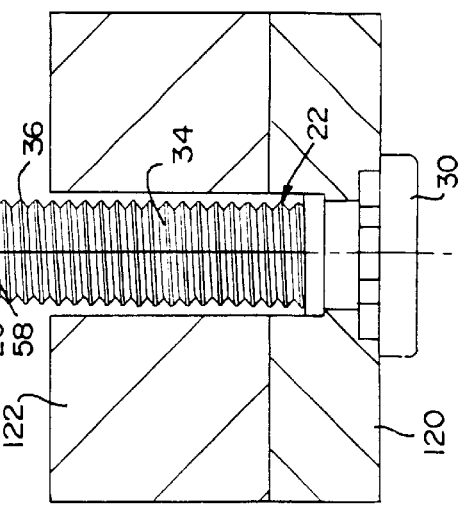
FIGS. 23–25 are side elevational views of the anti-cross-threading fastener member shown in FIGS. 1–5 staked to a workpiece and a partial cross-sectional view of an internally threaded nut in which the nut is being engaged with the anti-cross-threading fastener member of the present invention which illustrates the steps in an offset installation of the nut with the anti-cross-threading fastener member.
Figure 24:
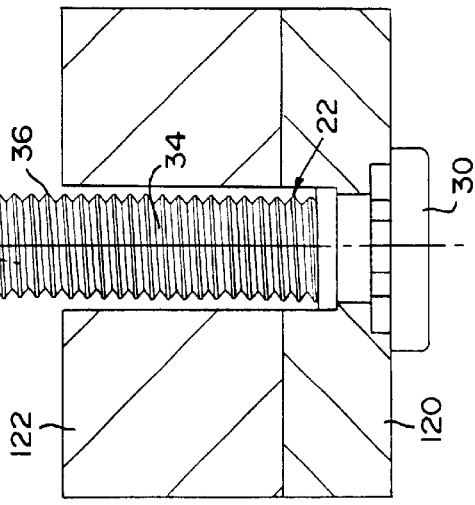
Figure 23:
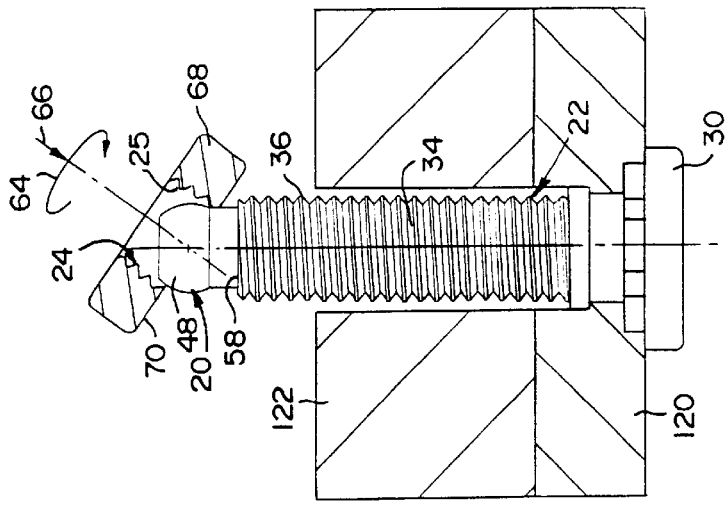
Figure 28:
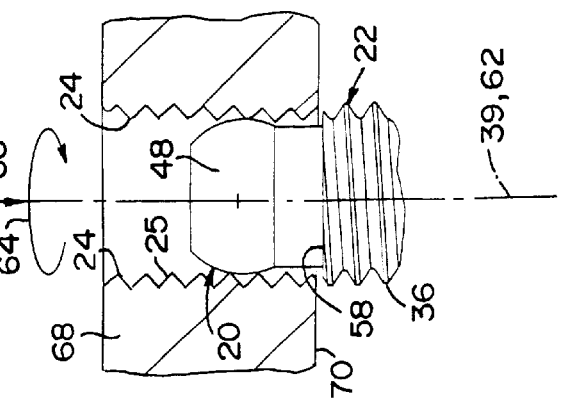
FIGS. 26–28 are side elevational views of the anti-cross-threading fastener member shown in FIGS. 1–5 and a partial cross-sectional view of an internally threaded nut in which the nut is being engaged with the anti-cross-threading fastener member of the present invention which illustrates the steps in an offset installation of the nut with the anti-cross-threading fastener member.
Figure 27:
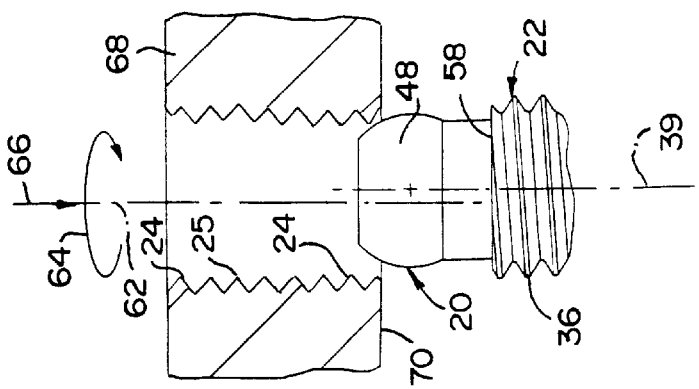
Figure 26:
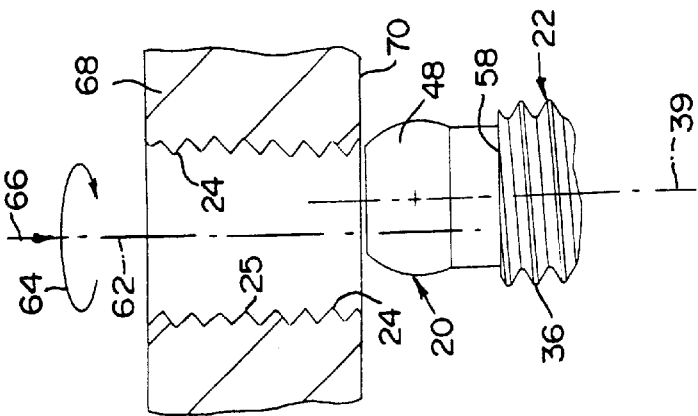

FIGS. 10–14 and 15–18 illustrate the fastener member 22 shown in FIGS. 1–5 being inserted in an out-of-alignment or off-angle installation into the female member 68, 98. FIGS. 19–22 illustrate the fastener member 22 shown in FIGS. 1–5 being inserted in an offset (as opposed to an off-angle orientation) installation into the female member 68. FIGS. 23–25 illustrate the female member 68 being engaged with the fastener member 22 shown in FIGS. 1–5 in an out-of-alignment or off-angle installation. FIGS. 26–28 illustrate the female member 68 being engaged with the fastener member 22 shown in FIGS. 1–5 being inserted in an offset (as opposed to an off-angle orientation) installation.

The generalities of each fastener member 22, 22b, 22c, 22d, 22e is described with respect to the first embodiment of the fastener member 22. The generalities of the fastener member design described with respect to the first embodiment apply to each embodiment unless otherwise noted herein. The specifics of each embodiment is thereafter described.

Generally, the fastener member 22 of the present invention has a head 30 with a threaded shank portion 34 extending therefrom and the novel point 20 at the end of the threaded shank portion 34. A multilobular recess 32, preferably a TORX PLUSH® recess, is provided in the head 30. The threaded shank portion 34 has a plurality of machine screw helical thread turns 36 thereon. The point 20 is provided on the opposite end of the threaded portion 34 from the head 30 and includes an unthreaded cylindrical portion 38 extending from the end of the threaded shank portion 34 and an unthreaded bulbous portion 48 at the opposite end of the unthreaded cylindrical portion 38. A centerline of the fastener member 22 is shown at 39.

The thread turns 36 on the threaded shank portion 34 define a major external diameter 40 and a minor or root diameter 42. The screw thread turns 36 on the threaded shank portion 34 are standard machine screw threads having a 60° profile with the exception of a lead thread 44 which is of a novel design as described herein.

The cylindrical portion 38 of the point 20 defines a blank diameter 46 which is slightly less than the minor diameter 42 of the external thread turns 36 on the threaded shank portion 34. The unthreaded bulbous portion 48 is radiused or generally spherical as described herein and has a predetermined maximum diameter 50. The maximum diameter 50 defined by the bulbous portion 48 is slightly less than the minor diameter 28 of the internal threads 25 of the tapped bore 24, and preferably approximately 90% to 99.8% of the minor diameter 28 of the internal threads 25 of the tapped bore 24. The radiused portion maximum diameter 50 intersects the blank diameter 46 of the cylindrical portion 38 at point 56.

Figure 5:
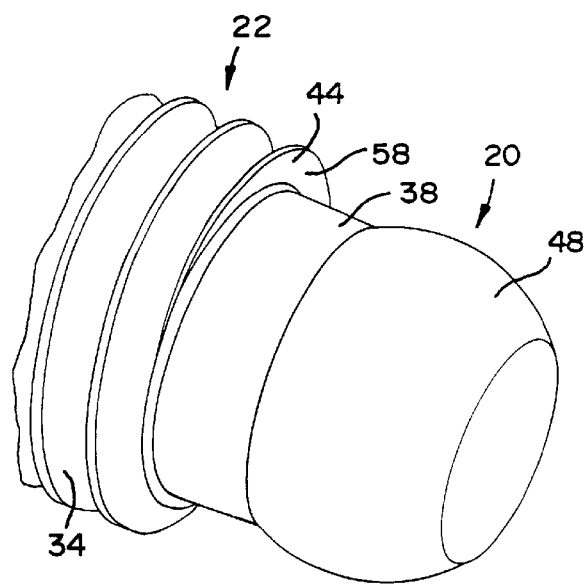
FIG. 5 is an enlarged, perspective view of the entry end portion of the anti-cross-threading fastener member shown in FIG. 1 showing the thread run-out of the threaded shank portion of the fastener member.
Figure 6:
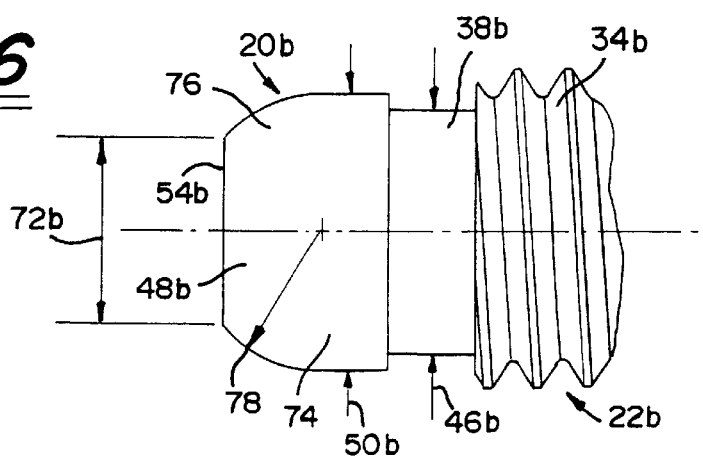
FIG. 6 is an enlarged, partial side elevational view of the entry end portion of an anti-cross-threading fastener member which incorporates the features of a second embodiment of the invention.

As shown in FIGS. 3–5, the lead thread 44 of the fastener member 22 has a thread profile which transitions from the standard 60° thread profile of the remainder of the threaded shank portion 34 to a truncated thread profile having a truncated or abrupt end face 58 at the start of the cylindrical portion 38. The novel truncated lead thread design in the present invention serves to promote proper thread engagement when the fastener member 22 is engaged in the bore. The abrupt end face 58 of the lead thread 44 defines a thread profile which is truncated generally perpendicular to the fastener member centerline 39 in the direction of the thread height.

That is to say, a plane containing the abrupt end face 58 is generally transverse or approximately perpendicular to the axis 39. The truncation of the lead thread 44 is also provided circumferentially around the centerline 39 of the fastener member 22. The lead thread truncation occurs in at most one pitch of the thread turns 36, that is, the thread profile progress goes none or minimal to the full thread in less than one turn of the thread helix. Preferably, this occurs in approximately one-half a thread turn or pitch.

The distance 60 from the abrupt end face 58 on the threaded shank portion 34 to the center of the bulbous portion 48 is selected to insure that when the abrupt end face 58 contacts a top surface of the tapped bore 24 in an out-of-alignment/off-angle or offset condition as described herein, the bulbous portion 48 of the point 20 is inside the tapped bore 24 before engagement of the thread turns 36 on the threaded shank portion 34 with the threads 25 in the tapped bore 24. Thus, the length of the cylindrical portion 38 is at least equal to approximately one pitch of the thread turns 36 on the threaded shank portion 34. This allows the fastener member 22 to self-align within the tapped bore 24 without cross-threading, as explained herein.

With respect to the specifics of the first embodiment, the bulbous portion 48 of the novel point 20 can be fully spherical, as shown in phantom lines 52 in FIG. 2, or can be partially spherical with a truncated end surface 54, as shown in the remainder of the drawings. The end surface 54 defines a diameter 72.

With respect to the specifics of the second embodiment of the fastener member 22b having the novel point 20b on one end of the threaded shank portion 34b which is shown in FIG. 6, the bulbous portion 48b of the point 20b has a generally cylindrical portion 74 and a radiused portion 76 defined by radius 78 which extends from the center of the bulbous portion 48b. A truncated end surface 54b is provided at the end of the radiused portion 74 and defines a diameter 72b.

The third embodiment of the fastener member 22c is shown in FIG. 7. The fastener member 22c includes the novel point 20c on one end of the threaded shank portion 34c. In this embodiment of the fastener member 22c, the cylindrical portion 38 which is shown in the other embodiments has been eliminated and instead, the bulbous portion 48c is directly connected to the end of the threaded shank portion 34c. The bulbous portion 48c is formed from a radiused portion 80 defined by radius 82. A truncated end surface 54c is provided at the end of the radiused portion 80 and defines a diameter 72c.

The fourth embodiment of the fastener member 22d is shown in FIG. 8. The fastener member 22d includes the novel point 20d on one end of the threaded shank portion 34d. The bulbous portion 48d of the point 20d has a first radiused portion defined by radius 84, a second radiused portion defined by radius 86, a third radiused portion defined by radius 88 and a fourth radiused portion defined by radius 90. A truncated end surface 54d is provided at the end of the radiused portion defined by radius 90 to define a diameter 72d.

With respect to the specifics of the fifth embodiment of the fastener member 22e having the novel point 20e on one end of the threaded shank portion 34e which is shown in FIG. 9, the bulbous portion 48e of the point 20e has a first radiused portion defined by radius 92, a second radiused portion defined by radius 94, and a generally tapered portion defined by angle 96. A truncated end surface 54e defining a diameter 72e is provided at the end of the bulbous portion 48e.

In each of the embodiments, the diameter 72, 72b, 72c, 72d, 72e of the end surface 54, 54b, 54c, 54d, 54e is less than the minor diameter 28 defined by the internal threads 25 and less than the maximum diameter 50, 50a, 50b, 50c, 50d, 50e of the bulbous portion 48, 48b, 48c, 48d, 48e. This prevents the end surface 54, 54b, 54c, 54d, 54e from catching on the internal threads 25 of the tapped bore 24 when the bulbous portion 48, 48b, 48c, 48d, 48e is entering into the bore 24. The truncation of the bulbous portion 48, 48b, 48c, 48d, 48e may be eliminated such that the diameter 72, 72b, 72c, 72d, 72e is zero and the end of the bulbous portion 48, 48b, 48c, 48d, 48e is rounded or comes to a point.

Now that the specifics of the various embodiments have been described, the method of inserting the fastener member 22, 22b, 22c, 22d, 22e into the stationary tapped bore 24 in the workpiece, the nut 68 or the rivet 98 is described with regard to two conditions: an out-of-alignment or off-angle condition shown in FIGS. 10–14 and 15–18 and an offset condition shown in FIGS. 19–22. Thereafter, the method of engaging the nut 24 with the stationary fastener member 22, 22b, 22c, 22d, 22e is described with regard to two conditions: an out-of-alignment or off-angle condition shown in FIGS. 23–25 and an offset condition shown in FIGS. 26–28. The engagement process is described with respect to the first embodiment of the fastener member 22 with the understanding that the method of engagement of the second through fifth embodiments of the fastener member 22b, 22c, 22d, 22e and the female member is effected in the same manner.

The fastener member 22 of the present invention self-aligns with the tapped bore 24 in the workpiece, in the nut 68 or in the rivet 98 to correct an out-of-alignment or off-angle (FIGS. 10–14 and FIGS. 15–18) so as to prevent cross-threading of the fastener member thread turns 36 with the tapped bore threads 25. An out-of-alignment or off-angle installation of the fastener member 22 into the tapped bore 24 results when the centerline 39 of the fastener member 22 is at an angle to the centerline 62 of the tapped bore 24. An out-of-alignment or off-angle installation of the fastener member 22 which is rotating (shown by arrow 64) while attempting to be installed into the tapped bore 24 in a workpiece or nut 68 is shown in FIGS. 10–14 and into the tapped bore 24 in a rivet 98 staked to a workpiece 100 is shown in FIGS. 15–18.

Attention is now directed to FIGS. 10–14. As shown in FIG. 11, the bulbous portion 48 first contacts a thread inside the tapped bore 24. The female member which has the tapped bore 24 therein remains stationary during this engagement process. The centerline 39 of the fastener member 22 begins to align, because of a moment action caused by the end load (shown by arrow 66) placed on the fastener member 22, with the centerline 62 of the tapped bore 24 by rotating or pivoting around the bulbous portion 48 because of the radiused or bulbous portion's 48 contact with the threads 25 in the tapped bore 24. More specifically, because the bulbous portion 48 is radiused, the surface portion engages the crests of the female threads 25 producing a tendency for the fastener member 22 to rock or pivot towards the aligned position, due to the application of the end load 66 and the force vector produced by the end load 66. The moment action continues to cause the point 20 to move further into the tapped bore 24 until the abrupt end face 58 of the threaded shank portion 34 contacts the top surface 70 of the workpiece or nut 68 surrounding the tapped bore 24, see FIG. 12. This contact will momentarily preclude the fastener member 22 from moving axially into the tapped bore 24 and provides a fulcrum location that promotes or causes an increased pivoting action because of the engagement of the bulbous portion 48 with the threads 25 in the tapped bore 24 which further aligns the centerline 39 of the fastener member 22 with the centerline 62 of the tapped bore 24, see FIG. 13, and the engagement of the abrupt end face 58 with the workpiece or nut 68. The point 20 is disposed inside the tapped bore 24 before or in conjunction with thread engagement between the thread turns 36 on the threaded shank portion 34 and the threads 25 in the tapped bore 24 is achieved. Once the centerline 39 of the fastener member 22 aligns with the centerline 62 of the tapped bore 24, the fastener member 22 is driven into the tapped bore 24, FIG. 14, by rotation shown by arrow 64 and application of the end load shown by arrow 66. Because the centerlines 39, 62 are aligned, misalignment that causes cross-threading is greatly reduced. This provides for a smooth insertion of the fastener member 22 into the tapped bore 24 which reduces the chances of a wedging action between the threads 25, 36. Also, the self-aligning action reduces the probability of a no-start condition which reduces installation time. Also, due to the progressive nature of the profile of the lead thread, as produced by truncation, initial proper engagement of the male and female threads is promoted, to further reduce the possibility of a cross-thread condition.

Figure 16:
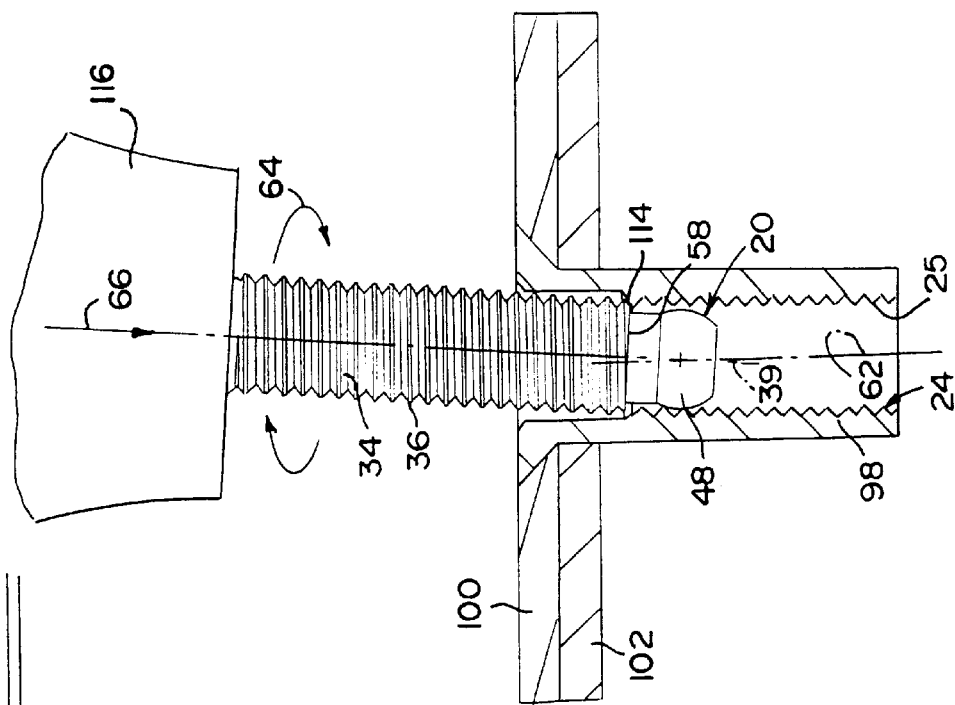
Figure 15:
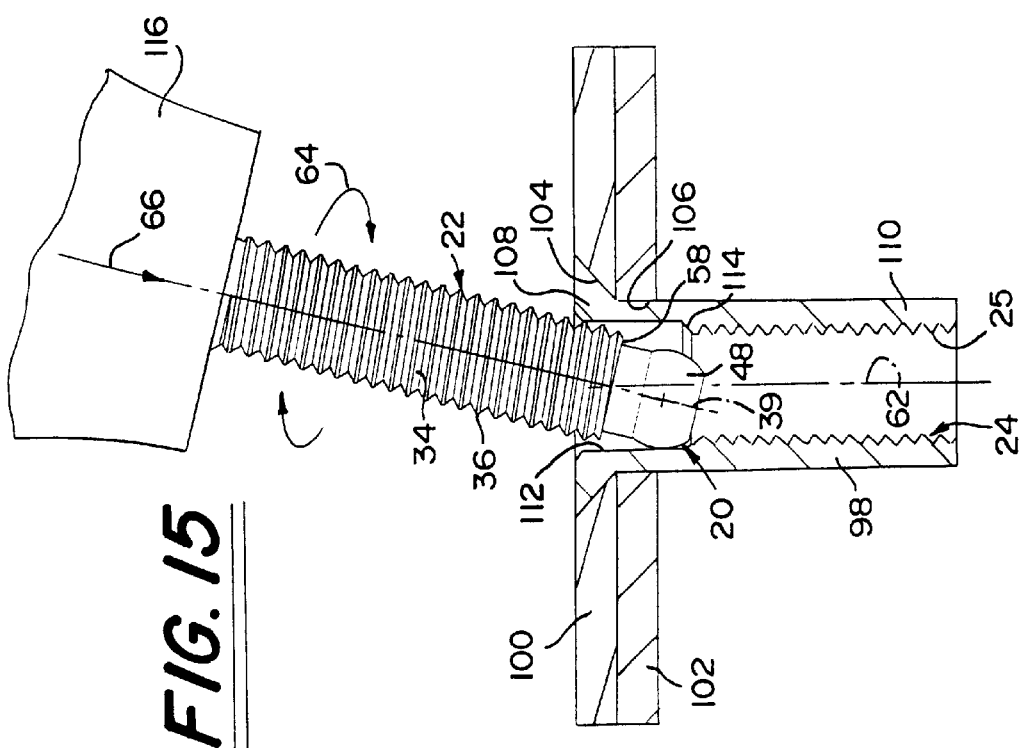

Attention is now directed to FIGS. 15–18. In these FIGURES, the rivet 98 is staked to workpiece 100. A second workpiece 102 abuts against workpiece 100. The rivet extends through apertures 104, 106, respectively, in workpieces 100, 102. Initially, as shown in FIGS. 15–17, the workpiece 102 can be disengaged with workpiece 100 as it only abuts thereagainst.

Rivet 98 is conventional and known in the art. Rivet 98 includes a head 108 and a shank 110 depending therefrom. The head 108 is staked to, or otherwise suitably connected to, workpiece 100. The internally threaded bore 24 is provided through a portion of the shank 110. A countersunk passageway 112 is provided through the head 108 and through a portion of the shank 110 and is axially aligned with the internally threaded bore 24. The countersunk passageway 112 defines a shoulder 114 at the point where the threads 25 start in the rivet 98.

To start engagement of the fastener member 22 with the rivet 98, as shown in FIG. 15, the bulbous portion 48 first contacts a thread inside the tapped bore 24. The rivet 98 remains stationary during this engagement process. The centerline 39 of the fastener member 22 begins to align, because of a moment action caused by the end load (shown by arrow 66) placed on the fastener member 22 by tool 116, with the centerline 62 of the tapped bore 24 by rotating or pivoting around the bulbous portion 48 because of the radiused or bulbous portion's 48 contact with the threads 25 in the tapped bore 24. The moment action continues to cause the point 20 to move further into the tapped bore 24 until the abrupt end face 58 of the threaded shank portion 34 contacts the should 114 within the rivet 98 at the top of the tapped bore 24, see FIG. 16. This contact will momentarily preclude the fastener member 22 from moving axially into the tapped bore 24 and provides a fulcrum location that promotes or causes an increased pivoting action because of the engagement of the bulbous portion 48 with the threads 25 in the tapped bore 24 which further aligns the centerline 39 of the fastener member 22 with the centerline 62 of the tapped bore 24, see FIG. 17, and the engagement of the abrupt end face 58 with the rivet 98. The point 20 is disposed inside the tapped bore 24 before or in conjunction with thread engagement between the thread turns 36 on the threaded shank portion 34 and the threads 25 in the tapped bore 24 is achieved. Once the centerline 39 of the fastener member 22 aligns with the centerline 62 of the tapped bore 24, the fastener member 22 is driven into the tapped bore 24, FIG. 17, by rotation shown by arrow 64 and application of the end load shown by arrow 66. As the reader will note, this procedure is similar to that described with respect to the insertion of the fastener member 22 into the workpiece as described with respect to FIGS. 10–14.

In this embodiment, as shown in FIG. 18, the fastener member 22 is driven into the rivet 98 until the tool 116 abuts against the top surface of workpiece 100. Continued rotation is imparted to the fastener member 22, as shown by arrow 64, and because the tool 116 abuts against the top surface of workpiece 100 and continued rotation is imparted to the fastener member 22, this causes the rivet shank 110 to move upwardly along the threaded portion 34 of the fastener member 22, thereby causing a portion of the rivet shank 110 to deform and form deformed portion 118 and to abut against the underside of workpiece 102 as shown in FIG. 18. This locks the workpiece 102 to workpiece 100 and the threaded portion 34 of the fastener member 22 maintains thread engagement with the rivet 98. If desired, the fastener member 22 can be removed from engagement with the rivet 98 by reverse rotation. The deformed portion 118 remains and does not straighten out when the fastener member 22 is removed, thereby maintaining the locked condition of workpiece 102 to workpiece 100. Thereafter, a like fastener member, or other fastener member, can be reinserted into the rivet 98.

The fastener member 22 of the present invention also self-aligns with the bore 24 to correct an offset condition to prevent cross-threading of the fastener member thread turns 36 with the tapped bore threads 25. An offset installation of the fastener member 22 into the tapped bore 24 results when the centerline 39 of the fastener member 22 is generally parallel to, but offset from, the centerline 62 of the tapped bore 24. An offset installation of the fastener member 22 of the present invention which is rotating (shown by arrow 64) while attempting to be installed into the tapped bore 24 in the workpiece or nut 68 is shown in FIGS. 19–22.

As shown in FIG. 19, the bulbous portion 48 first contacts the top surface 70 of the workpiece or nut 68 surrounding the tapped bore 24. The workpiece or nut 68 which has the tapped bore 24 therein remains stationary during this engagement process. The fastener member 22 under end load 66 will move until the bulbous portion 48 of the point 20 contacts the first thread of the tapped bore 24, see FIG. 20. It should be noted that the force vector resulting from the end load 66 and the rotation 64, coupled with the engagement of the bulbous or spherical point portion 48 with the rim of the tapped bore 24, will result in a force vector or movement of the fastener member 22 toward the aligned position for the respective axes 39 and 62; sufficient alignment having been attained in FIG. 21. As the end load 66 is applied to the fastener member 22, the fastener member 22 moves radially inward because of a cam action inward towards the centerline 62 of the tapped bore 24 caused by the movement around the bulbous portion 48, see FIGS. 20 and 21. As shown in FIG. 21, the point 20 is inside the tapped bore 24 before thread engagement between the thread turns 36 on the threaded shank portion 34 and the threads 25 in the tapped bore 24 is achieved. Once the centerlines 39, 62 are aligned, the fastener member 22 is driven into the tapped bore 24 by rotation shown by arrow 64 and application of the end load shown by arrow 66, see FIG. 22. Because the centerlines 39, 62 are aligned, misalignment that causes cross-threading is greatly reduced. Further, the novel progressive form lead thread profile or configuration, will also function to promote proper initial thread engagement. This provides for a smooth insertion of the fastener member 22 into the tapped bore 24 which reduces the chances of a wedging action between the thread turns 36 of the fastener member 22 and the threads 25 in the tapped bore 24. Also, the self-aligning action reduces the probability of a no-start condition which reduces installation time. The thread engagement of the fastener member 22 is allowed only when the centerline 39 of the fastener member 22 is aligned with the centerline 62 of the tapped bore 24.

FIGS. 23–25 and FIGS. 26–28 show a condition where the fastener member 22 is stationary and the member housing the internally threaded bore 24 is in the form of a nut 68 and is the driven component. FIGS. 23–25 illustrate the offset condition and FIGS. 26–28 illustrate the out-of-alignment or off-angle condition. It is the nut 68 that is the driven component and upon which the rotational force 64 and the end load 66 are applied. When the fastener member 22 is stationary, it is staked to or formed integral with a workpiece 120 (not shown in FIGS. 26–28). A second workpiece 122 (not shown in FIGS. 26–28) abuts against workpiece 120, such that when the nut 68 is engaged with the fastener member 22, the second workpiece 122 is locked to the first workpiece 120. The fastener member 22 extends through apertures provided in the workpieces 120, 122. As the fastener member 22 is staked to workpiece 120, the drive head 30 thereof may be eliminated, if desired.

In FIGS. 23–25, the operation of assembling the fastener member 22 and the nut 68 is essentially the same as that of FIGS. 10–14, except that the fastener member 22 is stationary and the nut 68 is driven. Similarly, in FIGS. 26–28, the operation of assembling the fastener member 22 and the nut 68 is essentially the same as that of FIGS. 19–22, except that the fastener member 22 is stationary and the nut 68 is driven. That is, in each of these FIGURES, the nut 68 is component to which the rotational and end load forces 64, 66 are applied.

Attention is now directed to FIGS. 23–25. With reference to FIG. 23, the centerline 39 for the fastener member 22 is off-angle with respect to the centerline 62 of the nut 68. In operation, similar to that as illustrated and described with respect to FIGS. 10–14, the rotationally driven nut 68 will tend to rock upon the bulbous portion 48 to attain alignment of the respective axes 39, 62. Further, the abrupt end face 58 on the fastener member 22 and its engagement with the surface 70 provide a fulcrum which promotes the pivoting action of the nut 68 from the off-angle misalignment to an axially aligned condition wherein the threads 25 and 36 may be engaged without cross-threading.

Attention is directed to FIGS. 26–28. With reference to FIG. 26, the centerline 39 for the fastener member 22 is offset with respect to the centerline 62 of the nut 68. In operation, similar to that as illustrated and described with respect to FIGS. 19–22, the surface 70 of the nut 68 contacts the bulbous portion 48. Because of the rotational end load on the nut 68, the engagement of the bore 24 with the bulbous portion 48 will produce force vectors that result in a cam action moving the nut 68 to the right, as viewed in the drawings, to align the respective axes 39 and 62, see FIGS. 27 and 28. Once proper alignment is attained, FIG. 28, the threads 25 and 26 may be engaged without danger of cross-threading.

Thus, the function of these methods shown in FIGS. 23–25 and 26–28, wherein the nut 68 is driven and the fastener member 22 is stationary involves essentially the same relative movement of the components, as shown in FIGS. 10–14, given an off-angle condition, or as shown in FIGS. 19–22, given an offset condition.

It is to be noted that the fastener member 22 of the present invention will permit thread engagement with the tapped bore 24 only when the centerline 39 of the fastener member 22 is aligned with the centerline 62 of the tapped bore 24 and when the point 20 is inside the tapped bore 24. A standard, prior art header point typically has two to four lead threads that are tapered which allows the fastener member threads inside the tapped bore before thread engagement. The tapered threads can cause a wedging action with the internal threads which causes cross-threading.

In addition, the point 20 used in the fastener member 22 compensates for wobble at the end of the fastener member 22 which reduces the potential damage to the surface of a joint.

The length of the point 20 is 0.75 times the nominal diameter of the fastener member 22 which is less than the prior art "P" point design that is one or more times the nominal diameter of a fastener member. This offers savings versus competitive designs by lowering material cost, weight reduction. In addition, this minimizes interference problems with the point 20 of the fastener member 22 with other components.

The fastener member 22 of the present invention can be economically and quickly manufactured. The fastener member 22 can be rolled in one pass on a roll threader complete with threads 25 and the point 20. This improves productivity and lowers manufacturing costs.

It is to be noted that other shapes than those described herein can be provided for the point design. In the preferred form, at least one generally curved surface is provided on the bulbous portion. It is envisioned that the bulbous or partially spherical portion may take various forms and that a series of generally flat surfaces, when viewed in section, may be employed to provide a generally bulbous portion. As such, the term bulbous is not limited to spherically curved surfaces, but is used to includes all surface of generally spherical nature which functions in the manner of the present invention.

While preferred embodiments of the present invention are shown and described, it is envisioned that those skilled in the art may devise various modifications of the present invention without departing from the spirit and scope of the appended claims.

What is claimed is:

1. A fastener member for engagement with a female member having an internally threaded bore, said fastener member comprising:
    a shank portion having thread turns thereon, said threaded shank portion having a work entering end including a truncated lead thread which forms an abrupt end face, said abrupt face of said truncated lead thread being perpendicular to centerline of said shank portion and being formed 360° around said shank portion; and
    an unthreaded bulbous point proximate to said abrupt end face of said therad turns comprising a radiused portion which defines a maximum diameter, said point adapated to engaged within the internally threaded bore of the female member, wherein said radiused portion promotes alignment prior to the start of engagement of the fastener member threads with the internally threaded bore of the female member.

2. A fastener member as defined in claim 1, wherein said lead thread progresses from a partial to a full profile within one thread pitch.

3. A fastener member as defined in claim 1, wherein said threads on said shank portion are of a 60° thread profile.

4. A fastener member as defined in claim 1, wherein said radiused portion is formed from a predetermined number of radiused portions integrally formed with each other.

5. A fastener member as defined in claim 1, wherein said point further includes a tapered portion, said tapered portion being integrally formed with said radiused portion.

6. A fastener member as defined in claim 1, wherein said unthreaded bulbous point comprises a first radiused portion which defines a maximum diameter of said point and a second portion between said first radiused portion and said threaded shank portion, said second portion defining a diameter which is less than said maximum diameter.

7. A fastener member as defined in claim 6, wherein said second portion has a length which is at least approximately one pitch of the thread turns on said threaded shank portion to space said first radiused portion apart from said shank portion.

8. A fastener member as defined in claim 6, wherein said diameter of said second portion of said point is slightly less than a minor diameter of said threaded shank portion.

9. A fastener member as defined in claim 1, wherein said point includes a generally spherical portion.

10. A fastener member as defined in claim 1, wherein said point is partially generally spherical.

11. A fastener member as defined in claim 1, wherein said point has a truncated end surface.

12. A fastener member as defined in claim 1, wherein said shank portion further defines an opposite end to said work entering end and further includes a head at said opposite end.

13. A fastener member as defined in claim 12, further including a multilobular recess in said head for engagement with a tool.

14. A method of engaging a fastener member and a female member comprising the steps of:
    providing a fastener member having a shank portion including thread turns thereon and defining a central axis, said threaded shank portion having an unthreaded bulbous point at an end thereof and having a lead thread proximate to said point, said lead thread being truncated perpendicular to said central axis of said shank portion and being formed 360° around said shank portion to form an abrupt end face;
    providing a female member having an internally threaded bore and defining a central axis;
    engaging said point with said internally threaded bore of said female member in an off-angle condition wherein said central axis of said fastener member is angled relative to said central axis of said threaded bore;
    applying rotational movement and and end load to one or the other of said fastener member of said female member, thereby defining a driven member, while maintaining the other of said fastener member of said female member stationary, thereby defining a stationary member, such that said point is engaged with said female member to cause said fastener member to move around said point to promote alignment of said fastener member axis with said female member bore axis,
    and such that said abrupt end face is engaged with a top surface of said female member to cause said fastener member and said female member to move into proper alignment upon further rotation and end load to said driven member,
    and thereafter engaging said thread turns on said threaded shank portion with the internal threads in said threaded bore in said female member.

15. A method as defined in claim 14, wherein said point is completely inserted into said internally threaded bore prior to engagement of said threaded shank portion with said threads in said threaded bore in said female member.

16. A method as defined in claim 14, wherein said point comprises a first radiused portion which defines a maximum diameter of said point and a second portion between said first radiused portion and said threaded shank portion, said second portion defining a diameter which is less than said maximum diameter and having a length which is at least approximately one pitch of the thread turns on said threaded shank portion to space said first radiused portion apart from said shank portion, and wherein the spacing provided by said second portion between said first radiused portion and said threaded shank portion allows for the movement of said fastener member around said first radiused portion.

17. A method of engaging a fastener member and a female member comprising the steps of:

providing a fastener member having a shank portion including thread turns thereon and defining a central axis, said threaded shank portion having an unthreaded bulbous point at an end thereof and having a lead thread proximate to said point, said lead thread being truncated perpendicular to said central axis of said shank portion and being formed 360° around said shank portion to form an abrupt end face;

providing a female member having an internally threaded bore and defining a central axis;

engaging said point with said internally threaded bore of said female member in an offset condition wherein said central axis of said fastener member is generally parallel to but not aligned with said central axis of said threaded bore;

contacting a top surface of said female member with said abrupt end face prior to engagement of said threades shank portion;

applying rotational movement and an end load to one or the other of said fastener member or said female member, thereby defining a driven member, while maintaining the other of said fastener member or said remale member stationary, thereby defining a stationary member;

applying a transverse moment to said driven member to cause said center axes to align to move said fastener member and said female member into proper alignment, thereby to engage said thread turns of said threaded shank portion with the internal threads in said threaded bore in said female member.

18. A method as defined in claim 17, wherein said unthreaded bulbous point is completely inserted into said internally threaded bore prior to engagement of said threaded shank portion with said threads in said threaded bore in said female member.

\* \* \* \* \*

UNITED STATES PATENT AND TRADEMARK OFFICE
CERTIFICATE OF CORRECTION

PATENT NO. : 6,328,515 B1
DATED : December 11, 2001
INVENTOR(S) : Steven P. Donovan It is certified that error appears in the above-identified patent and that said Letters Patent is hereby corrected as shown below:

Column 7,
Line 9,. "TORX PLUSH" should be -- TORX PLUS --

Column 13,
Line 39, " therad" should be -- thread --

Column 15,
Line 17, "threades" should be -- threaded --

Column 16,
Line 5, "remale" should read -- female --

Signed and Sealed this

Eleventh Day of June, 2002

Attest:

JAMES E. ROGAN
Attesting Officer
Director of the United States Patent and Trademark Office